United States Patent
Ishimoto

(10) Patent No.: US 8,208,357 B2
(45) Date of Patent: Jun. 26, 2012

(54) OPTICAL DISC APPARATUS AND OPTICAL DISC DRIVE CONTROL METHOD

(75) Inventor: Tsutomu Ishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 158 days.

(21) Appl. No.: 12/613,656

(22) Filed: Nov. 6, 2009

(65) Prior Publication Data

US 2010/0157756 A1 Jun. 24, 2010

(30) Foreign Application Priority Data

Dec. 5, 2008 (JP) ................. 2008-311642

(51) Int. Cl.
*G11B 7/00* (2006.01)
(52) U.S. Cl. .................................. 369/53.25
(58) Field of Classification Search ........................ None
See application file for complete search history.

(56) References Cited

U.S. PATENT DOCUMENTS

| | | | | | |
|---|---|---|---|---|---|
| 3,670,316 | A | * | 6/1972 | Matthews et al. | 360/78.06 |
| 4,835,752 | A | * | 5/1989 | Nakatsu et al. | 369/30.17 |
| 5,243,586 | A | * | 9/1993 | Makiyama | 369/53.3 |
| 5,363,357 | A | * | 11/1994 | Niwayama | 369/44.27 |
| 2005/0190666 | A1 | * | 9/2005 | Ishimoto | 369/44.25 |
| 2006/0039251 | A1 | * | 2/2006 | Chen | 369/44.28 |
| 2006/0083126 | A1 | * | 4/2006 | Lin et al. | 369/44.29 |
| 2008/0089208 | A1 | * | 4/2008 | Verschuren | 369/112.23 |
| 2008/0267036 | A1 | | 10/2008 | Lee et al. | |
| 2009/0245054 | A1 | * | 10/2009 | Verschuren | 369/53.11 |
| 2010/0157756 | A1 | * | 6/2010 | Ishimoto | 369/47.15 |

FOREIGN PATENT DOCUMENTS

| | | | |
|---|---|---|---|
| JP | 56145565 A | * | 11/1981 |
| JP | 2007-533061 | | 11/2007 |
| JP | 2008-41218 | | 2/2008 |

OTHER PUBLICATIONS

T. Ishimoto, et al., "High-tranfer-rate near-field writable system for a polycarbonate disc", Optical Data Storage 2004, Proceedings of SPIE Reprint, vol. 5380, pp. 233-242 and cover page.

T. Ishimoto, et al., "Technologies for removability in a near-field optical disc system", Optical Data Storage 2006, Proceedings of SPIE Reprint, vol. 6282, 2006, 12 pages.

Tsutomu Ishimoto, et al., "Head Analysis in Air Flow on Near-Field Optical Disk System with 2-Axis Actuator" Japanese Journal of Applied Physics, vol. 44, No. 5B, 2005, pp. 3410-3411.

Tsutomu Ishimoto, et al., "Reliability for Lens Impact against Phase Change Recording Layer in a Near-Field Optical Disk Drive System", Proc. The $19^{th}$ Symp. on Phase Change Optical Information Storage, 2007, pp. 27-30.

* cited by examiner

*Primary Examiner* — Peter Vincent Agustin

(74) *Attorney, Agent, or Firm* — Oblon, Spivak, McClelland, Maier & Neustadt, L.L.P.

(57) ABSTRACT

A movement speed of a lens included in an optical pickup is calculated by differentiating a total reflection return light quantity that is detected by emitting laser light and near-field light onto a signal recording surface of a rotationally driven optical disc. On the basis of the calculated movement speed, processing for driving the optical pickup or the lens included in the optical pickup is controlled. For example, in a case where the calculated movement speed exceeds a permissible speed set in advance, retreat processing is performed for moving the optical pickup or the lens included in the optical pickup apart from a surface of the optical disc.

8 Claims, 8 Drawing Sheets

OPTICAL DISC APPARATUS AND OPTICAL DISC DRIVE CONTROL METHOD

BACKGROUND OF THE INVENTION

1. Field of the Invention

The present invention relates to an optical disc apparatus for recording or reproducing a signal on an optical disc using near-field light and an optical disc drive control method employed in the optical disc apparatus, and, more particularly, to a technique for controlling a gap between an optical disc and a lens.

2. Description of the Related Art

In recent years, in order to increase the recording density of an optical disc for recording or reproducing a signal using laser light, optical disc apparatuses for recoding or reproducing a signal using near-field light have been proposed. In such an optical disc apparatus using near-field light, laser light is emitted onto an optical disc using a Solid Immersion Lens (SIL). It is necessary to set the gap between the optical disc and an end surface of the SIL disposed in an optical pickup provided with an objective lens unit etc. to a distance (near field) at which near-field light is generated. The distance is generally half the wavelength of input laser light, and is a very short distance, for example, a several tens of nanometers. The distance at which near-field light is generated is referred to as a near field, while the distance at which near-field light is not generated is referred to as a far field.

In optical disc apparatuses in the related art such as DVDs for recording or reproducing a signal in a far-field region, the above-described gap control problem does not arise. However, in optical disc apparatuses using near-field light, since the distance between an optical disc and an SIL is very short, the gap control is very important. That is, since the distance between the optical disc and the SIL is very short, the SIL may collide with the optical disc under the influence of small change such as vibration externally transmitted to a disc apparatus or disc surface runout. This leads to damage to both of the SIL and the optical disc.

Thus, optical disc apparatuses using near-field light are easily affected by vibration externally transmitted thereto, shock externally given thereto, dust on an optical disc, a defect in the optical disc, etc. Methods of avoiding these effects include a method of improving robustness against disturbance by widening the servo band of a focus control system to approximately 13 kHz and a method of improving robustness against disturbance in principle by employing a conical-shaped lens.

In addition to the above-described methods performed in a signal processing system, there is a method of preventing disc damage caused when a lens collides with the surface of an optical disc by covering the surface of the optical disc with a hard coat (topcoat). This method is used for DVDs etc. For example, an example in which the method is used for an optical disc using a near field is described in T. Ishimoto et al. Proc. The 19th symp. on Phase Change Optical Information Storage, p. 27 (2007).

SUMMARY OF THE INVENTION

In T. Ishimoto et al. Proc. The 19th symp. on Phase Change Optical Information Storage, p. 27 (2007), the maximum permissible pickup movement speed at which an optical disc with a topcoat can be prevented from being damaged by a collision with a lens is 0.1 m/s. Accordingly, if a lens disposed at the leading end of a pickup collides with the surface of an optical disc with a topcoat at a speed higher than 0.1 m/s, the optical disc is damaged.

Thus, even if a topcoat is applied on the optical disc, the optical disc is damaged when the pickup collides with the optical disc at a speed exceeding a limited permissible pickup movement speed.

It is desirable to provide an optical disc apparatus capable of effectively preventing an optical disc for recording or reproducing a signal using near-field light from being damaged by a collision with a lens.

An optical disc apparatus according to an embodiment of the present invention includes: a driving unit for rotationally driving an optical disc; an optical pickup for recording/reproducing a signal on/from the optical disc by emitting laser light and near-field light onto a signal recording surface of the optical disc; an optical pickup driving unit for setting a distance between the optical pickup and the optical disc; a movement speed calculation unit for calculating a movement speed of a lens included in the optical pickup by differentiating a total reflection return light quantity of the laser light emitted onto the optical disc which is detected by the optical pickup; and a control unit for controlling driving processing that is performed upon the optical pickup or the lens included in the optical pickup by the optical pickup driving unit on the basis of the movement speed calculated by the movement speed calculation unit.

An optical disc drive control method according to an embodiment of the present invention includes the steps of: calculating a movement speed of a lens included in an optical pickup by differentiating a total reflection return light quantity that is detected by emitting laser light and near-field light onto a signal recording surface of a rotationally driven optical disc; and performing, in a case where the calculated movement speed exceeds a permissible speed set in advance, retreat processing for moving the optical pickup or the lens included in the optical pickup apart from a surface of the optical disc.

According to an embodiment of the present invention, if the estimated value of the movement speed of the lens included in the optical pickup exceeds a predetermined value for some reason and the lens may collide with the surface of the optical disc at a speed exceeding the predetermined value, it is possible to move the lens or the optical pickup including the lens apart from the surface of the optical disc.

According to an embodiment of the present invention, if it is determined that a lens moves toward a surface of an optical disc at a speed at which the lens may damage the optical disc when coming into contact with the optical disc, processing for moving the lens apart from the surface of the optical disc is performed so as to prevent the collision between the lens and the optical disc. Accordingly, for example, by moving the lens apart from the surface of the optical disc when it is determined that the lens moves toward the optical disc at a speed at which it is difficult for a topcoat on the surface of the optical disc to protect the surface of the optical disc from damage caused by the collision between the lens and the optical disc, it is possible to protect the optical disc and the optical pickup including the lens.

DESCRIPTION OF THE PREFERRED EMBODIMENTS

An embodiment of the present invention will be described below in the following order: 1. Entire Configuration of Disc Apparatus (FIGS. 1 and 2); 2. Configuration and Process of Gap Servo Section at Startup of Gap Servo Section (FIGS. 3 to 6); 3. Description of Disturbance Effect at the Time of Gap Servo Processing (FIGS. 7 to 9); 4. Process of Gap Servo Section in Operation (FIGS. 10 to 15); and 5. Description of Modification.

1. Entire Configuration of Disc Apparatus

An optical disc apparatus according to an embodiment of the present invention includes a Solid Immersion Lens (SIL) as an optical system. The SIL is moved closer to the surface of an optical disc, so that near-field light is generated. Using the near-field light, data is recorded/reproduced on/from the optical disc. First, the entire configuration of the optical disc apparatus including the SIL will be described.

Figure 1:
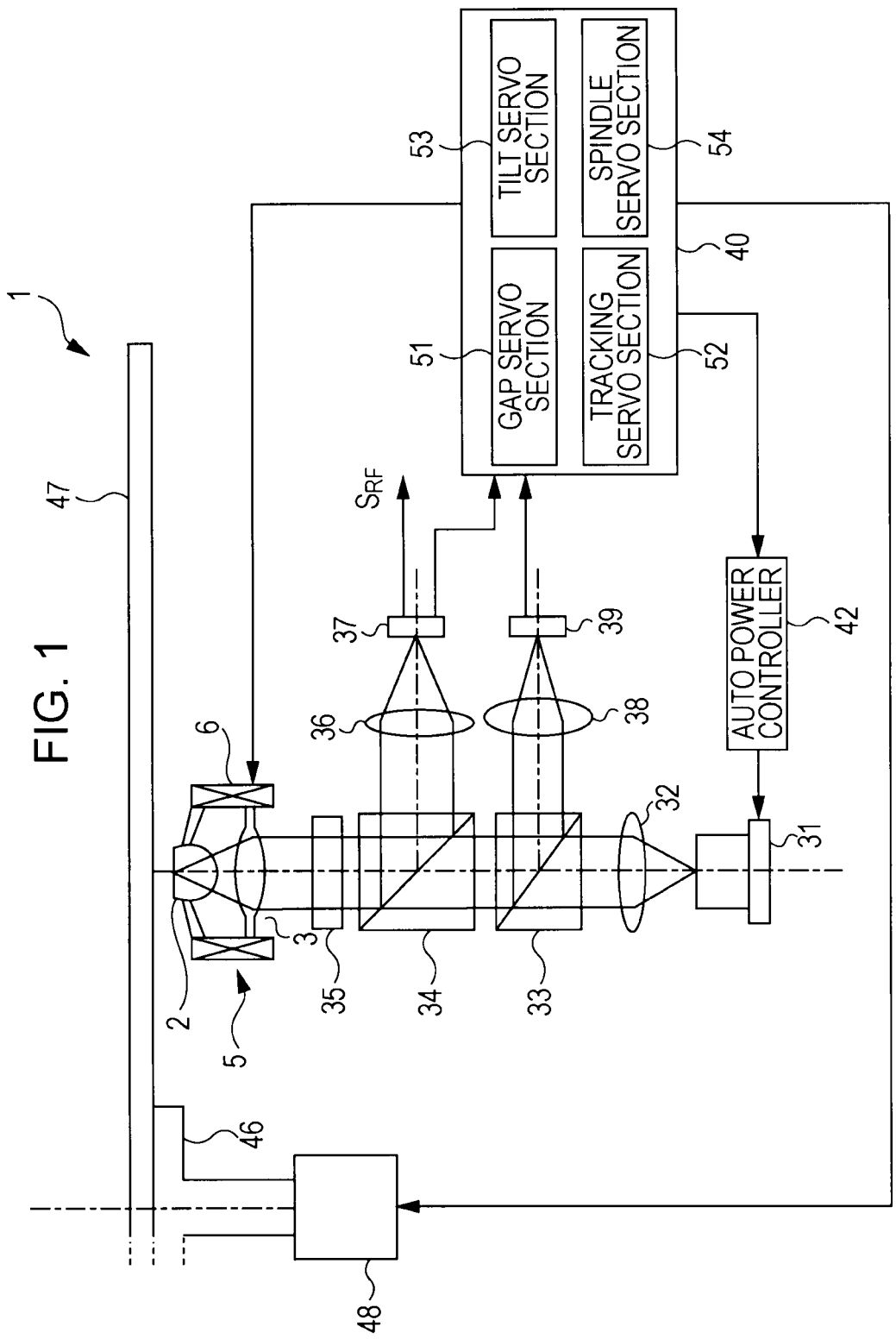
FIG. 1 is a block diagram illustrating an exemplary configuration of an optical disc apparatus according to an embodiment of the present invention.

FIG. 1 is a diagram illustrating a configuration of an optical disc apparatus according to an embodiment of the present invention. An optical disc apparatus 1 includes a laser diode (LD) 31 that is a light source. An optical disc 47 held by a disc chucking unit 46 is driven to rotate by a spindle motor 48. An optical pickup 5 for recording/reproducing data on/from the optical disc 47 is provided with a focusing optical system for emitting laser light. The focusing optical system includes an optical lens 3 that is an aspheric objective lens and a hemispherical or super-hemispherical Solid Immersion Lens (SIL) 2. The SIL illustrated in FIG. 1 is a super-hemispherical SIL, but may be a hemispherical SIL.

The optical path of laser light emitted from the laser diode 31 will be described. Laser light output from the laser diode 31 enters the optical lens 3 via a collimator lens 32, beam splitters 33 and 34, and a λ/4 wave plate 35. The laser light output from the laser diode 31 is linear polarized laser light. The linear polarized laser light is changed to circular polarized laser light via the λ/4 wave plate 35 and is then emitted onto the optical disc 47 via the optical lens 3 and the SIL 2. Laser light reflected from the optical disc 47 is changed to linear polarized laser light by passing through the λ/4 wave plate 35. The beam splitter 34 reflects light orthogonal to the linear polarized laser return light. The beam splitter 33 reflects light parallel to the linear polarized laser return light.

On an optical path split by the beam splitter 34, a focusing lens 36 and a light detection unit 37 such as a photodiode are arranged. The light detection unit 37 acquires a radio frequency (RF) signal ($S_{RF}$) from the light orthogonal to the return light. On an optical path split by the beam splitter 33, a focusing lens 38 and a light detection unit 39 such as a photodiode are arranged. The light detection unit 39 acquires a total reflection return light quantity signal from the light parallel to the return light. The light detection units 37 and 38 output signals (a tracking error signal, a gap error signal, etc.) necessary for servo control processing to a servo control system 40.

The servo control system 40 includes a gap servo section 51, a tracking servo section 52, a tilt servo section 53, and a spindle servo section 54. The concrete configuration of the gap servo section 51 will be described later. The tracking servo section 52 performs tracking control upon an optical head on the basis of a tracking error signal. The tilt servo section 53 controls the tilt angle of the optical pickup 5. The spindle servo section 54 controls the rotation of the spindle motor 48.

An auto power controller 42 performs control processing on the basis of a signal acquired by the light detection unit 37 or 39 so that the power of laser light output from the laser diode 31 is stabilized. At the time of reproduction, the auto power controller 42 may stabilize the output of the laser diode 31 without performing servo control processing. The optical pickup 5 emits near-field light onto an information recording surface of the optical disc 47.

A control unit 122 for receiving an output of a light detection unit 121 generates a gap control signal SG by feedforward control and a tilt control signal ST, and outputs these signals to a driving unit 113. The driving unit 113 is formed of a biaxial actuator or a triaxial actuator with a voice coil motor. A driving unit used for gap control and a driving unit used for tilt control may be separately disposed, and control signals may be individually input into these driving units. Various optical elements including an aberration correction optical element may be added to the components illustrated in FIG. 1.

Figure 2:
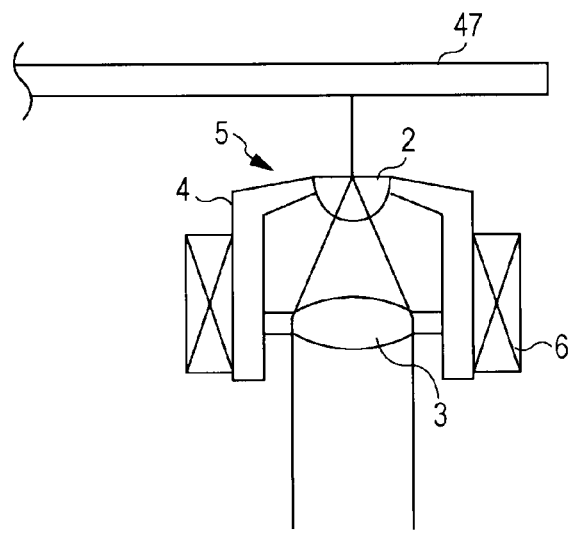
FIG. 2 is a diagram illustrating an optical pickup and a main part of an optical disc which are included in the optical disc apparatus illustrated in FIG. 1.

FIG. 2 is a diagram illustrating the relationship between a lens holding unit included in the optical pickup 5 and the optical disc 47. FIG. 2 illustrates a cross section of lenses. The optical pickup 5 faces the optical disc 47. At the leading end of the optical pickup 5, a lens holder 4 accommodates the SIL 2 and the aspheric optical lens 3 and is disposed on a biaxial device 6 functioning as a moving mechanism. Although the concrete configuration of the biaxial device 6 is not particularly illustrated, it is formed of coils in two axial directions, a yoke, etc. If a predetermined servo voltage is applied to each of the coils, a current flows through the coil. As a result, tracking servo processing, focusing servo processing including gap servo processing, and tilt servo processing are controlled. The distance between the SIL 2 and the optical disc 47 which are illustrated in FIG. 2 is a distance for which the gap servo section 51 performs servo control processing.

Figure 3:
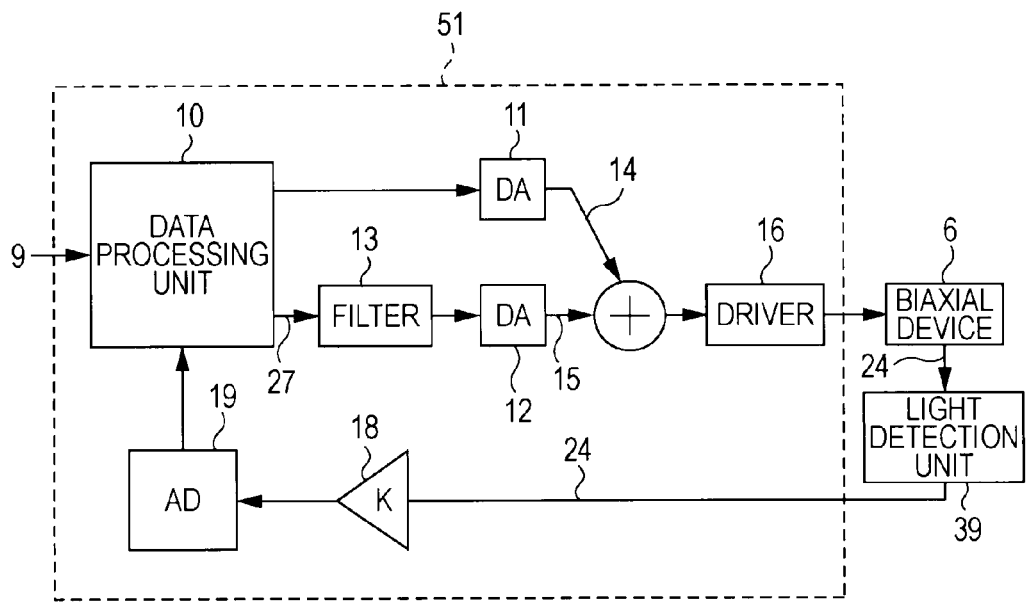
FIG. 3 is a block diagram illustrating an exemplary configuration of a gap servo section according to an embodiment of the present invention.

2. Configuration and Process of Gap Servo Section at Startup of Gap Servo Section FIG. 3 is a block diagram illustrating an exemplary configuration of the gap servo section 51. A control target of the gap servo section 51 is the biaxial device 6. The amount to be detected (the amount to be controlled) is a total reflection return light quantity 24, which is detected by the light detection unit 39 as described previously. The detected total reflection return light quantity 24 is normalized to, for example, 1V by a gain normalizer 18. A signal obtained by the normalization is digitalized by an analog-to-digital (AD) converter 19.

The digitalized total reflection return light quantity 24 is input into a data processing unit 10. The data processing unit 10 outputs a voltage used to move the SIL 2 closer to the optical disc 47. The output voltage is converted into an analog signal by a digital-to-analog (DA) converter 11 and is then output as an approach voltage (FF voltage) 14. On the other hand, a gap error signal is into a filter 13, is converted into an analog signal by a digital-to-analog (DA) converter 12, and is then output as a servo voltage 15. The approach voltage 14 and the servo voltage 15 are added, and the result of the addition is input into a driver 16. The driver 16 drives the biaxial device 6 so that a gap error becomes zero.

Figure 4:
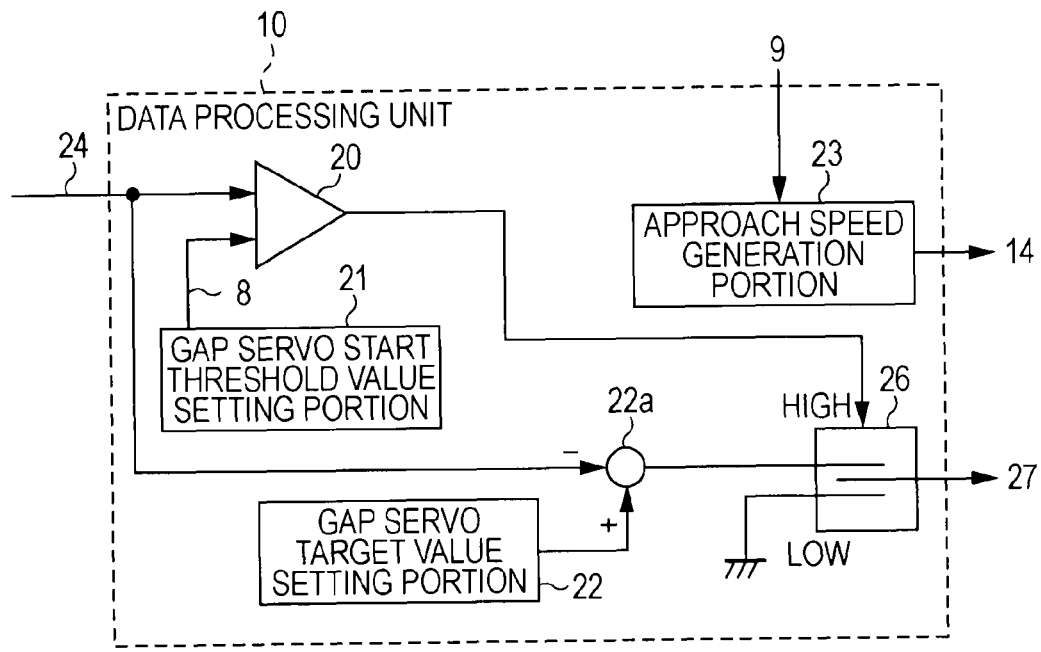
FIG. 4 is a block diagram illustrating details of a data processing unit according to an embodiment of the present invention (an exemplary configuration of the data processing unit at the time of start of gap servo processing)

FIG. 4 is a block diagram illustrating a concrete configuration of the data processing unit 10. The configuration of the data processing unit 10 illustrated in FIG. 4 is used when gap servo processing is started. The configuration (see, FIG. 10) of the data processing unit 10 used when the effect of disturbance is detected during gap servo processing will be described later. The data processing unit 10 receives the total reflection return light quantity 24 and a gap servo switch signal 9. The gap servo switch signal 9 is a signal input into the data processing unit 10 when an optical disc is loaded into the optical disc apparatus 1. Input timing of the gap servo switch signal 9 is not limited to the above-described timing. A comparator 20 compares the total reflection return light quantity 24 with a gap servo start threshold value 8 set by the gap servo start threshold value setting portion 21.

Figure 8:
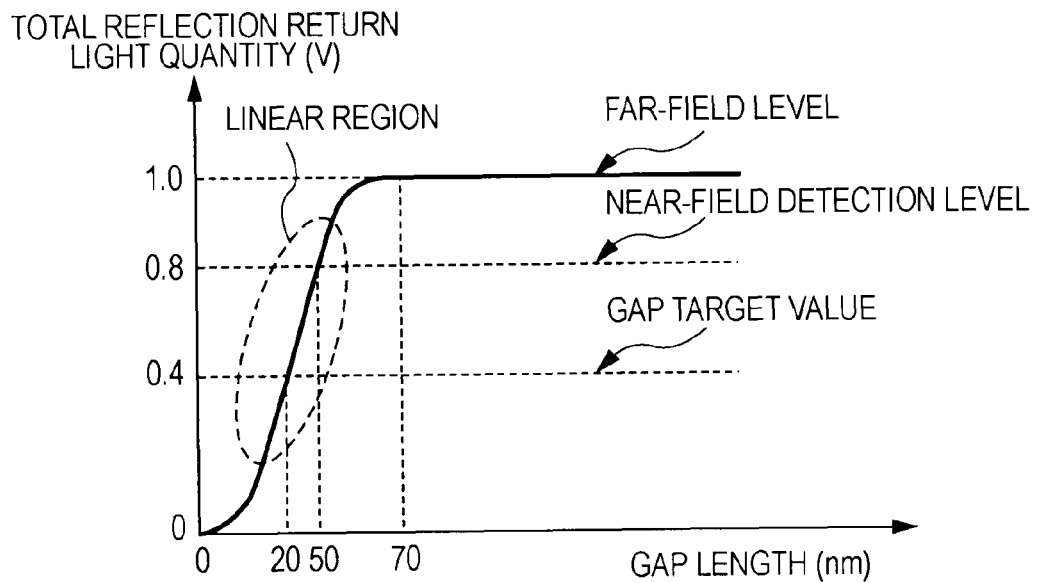
FIG. 8 is a characteristic diagram illustrating a relationship between a total reflection return light quantity and a gap length according to an embodiment of the present invention.

The gap servo start threshold value 8 is set to a value that falls within a near-field region and is larger than a gap servo target value. Referring to FIG. 8, for example, when the value of the total reflection return light quantity 24 in a far-field region is normalized to 1 (V), the gap servo start threshold value 8 is set to 0.8 (V). The gap-servo target value is set by a gap servo target value setting portion 22.

As a result of the comparison performed by the comparator 20, when the value of the total reflection return light quantity 24 is larger than the gap servo start threshold value 8, that is, when the SIL 2 is located in a far-field region, the comparator 20 outputs a low-level signal. On the other hand, when the value of the total reflection return light quantity 24 is equal to or smaller than the gap servo start threshold value 8, that is, when the optical head is located in a near-field region, the comparator 20 outputs a high-level signal. At a time when a high-level signal is output from the comparator 20, a switch 26 is turned on. As a result, gap servo processing is started. A subtracter 22a calculates a difference value between the gap servo target value set by the gap servo target value setting portion 22 and an approach voltage at the time of start of the gap servo processing (a voltage corresponding to the total reflection return light quantity obtained when the gap servo processing is started). The difference value calculated by the subtracter 22a is output as a servo voltage 27 used to set a gap to the target value. The servo voltage 27 is a gap error voltage.

Figure 5:
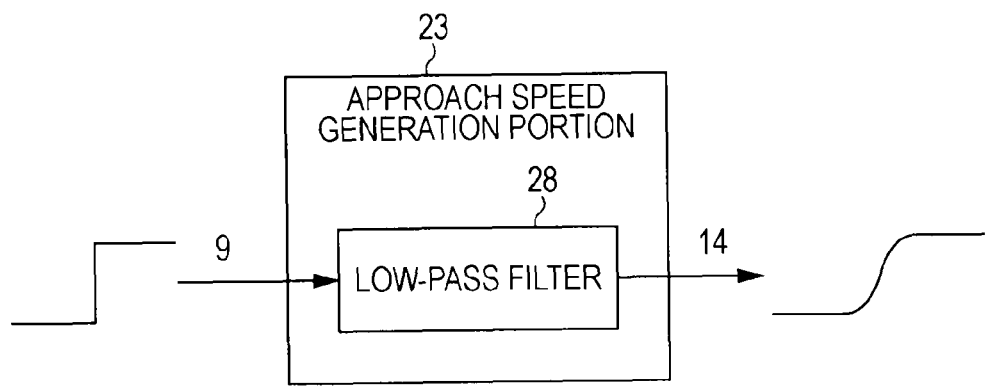
FIG. 5 is a block diagram illustrating an exemplary configuration of an approach speed generation portion according to an embodiment of the present invention.

FIG. 5 is a diagram illustrating an exemplary configuration of the approach speed generation portion 23. The approach speed generation portion 23 receives the gap servo switch signal 9 as an input signal and outputs the approach voltage (FF voltage) 14 as an output signal. The approach speed generation portion 23 is formed of, for example, a low-pass filter. As illustrated in FIG. 5, the gap servo switch signal 9 received as an input signal is a stepped signal. Accordingly, as the output signal of the approach speed generation portion 23, a signal with a gradual change is generated by removing a high-frequency component from the stepped signal as illustrated in FIG. 5. On the basis of the signal generated by removing a high-frequency component from the stepped signal, the optical pickup 5 smoothly moves toward the optical disc 47. At a time when the value of the approach voltage becomes a final voltage value, gap servo processing is started.

Figure 6:
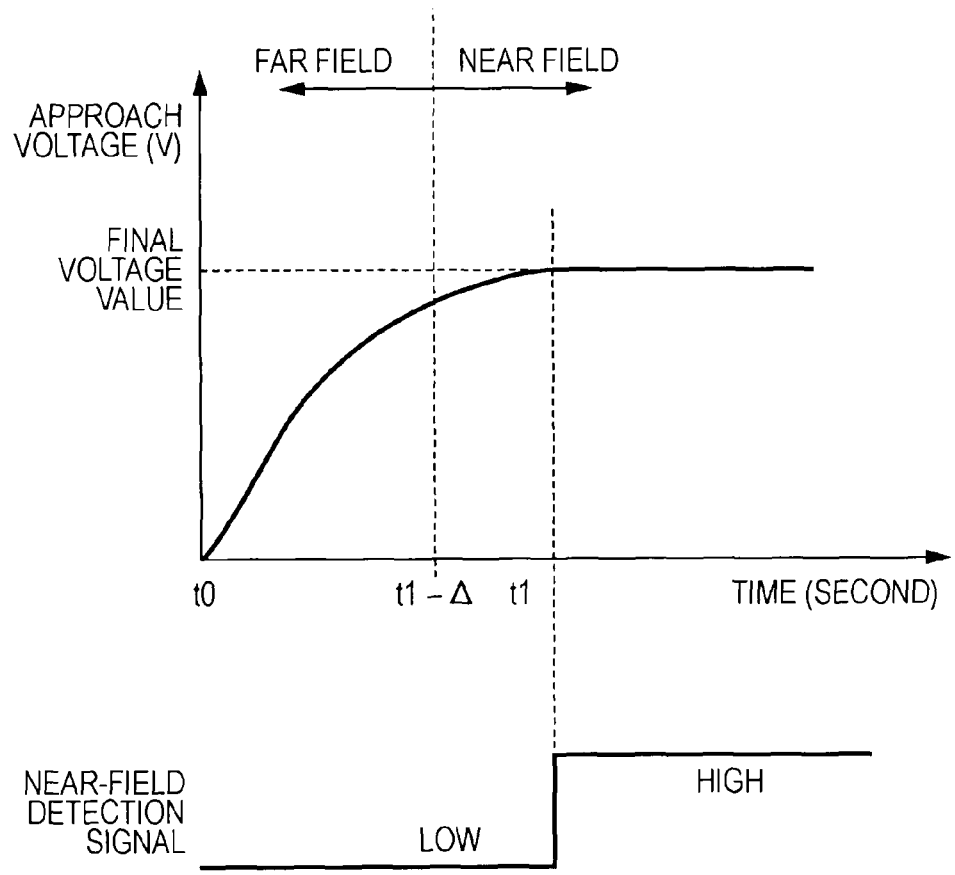
FIG. 6 is a characteristic diagram illustrating a change in approach voltage output from an approach speed generation portion according to an embodiment of the present invention with time.

FIG. 6 is a diagram illustrating an approach voltage change with time when gap servo processing is started. Referring to FIG. 6, at a time t1, a signal output from the comparator 20 is changed from a low level to a high level. As a result, gap servo processing is started. At a time t1−Δ before the time t1 at which a final voltage value is obtained, a far field is changed to a near field. Accordingly, at the time t1 at which the value of the approach voltage reaches the final voltage value, the optical pickup 5 nearly stops. That is, the movement speed of the optical pickup 5 is substantially zero. Accordingly, the initial speed of the optical pickup 5 in a gap direction at the start of the gap servo processing is substantially zero.

In this embodiment, the initial position of the optical pickup 5 is set so that the speed of the optical pickup 5 becomes substantially zero at the position thereof at the start of the gap servo processing. That is, the distance between the optical disc 47 and the optical pickup 5 is set in advance so that the speed of the optical pickup 5 becomes substantially zero at the position thereof at the start of the gap servo processing. This initial position of the optical pickup 5 is located in the far-field region apart from the optical disc 47. Thus, the approaching operation of the optical pickup 5 performed at a speed determined by the approach speed generation portion 23 and the gap servo control processing can be separately controlled only by setting in advance the initial position of the optical pickup 5. Consequently, the gap can be appropriately controlled by a system having a relatively simple configuration.

3. Description of Disturbance Effect at the Time of Gap Servo Processing

Figure 7:
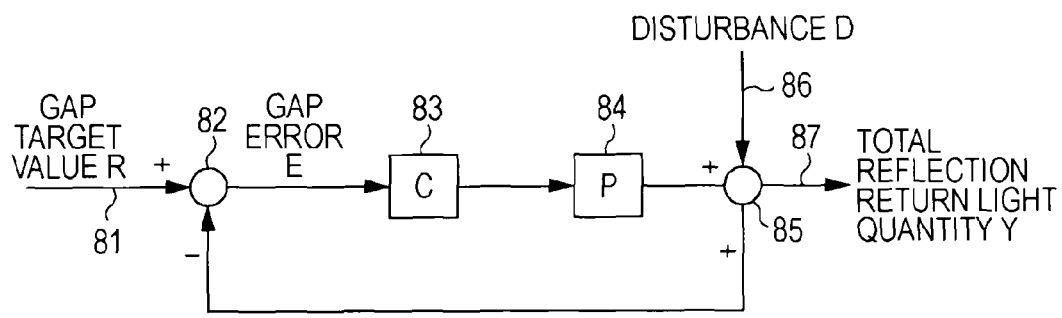
FIG. 7 is a diagram describing an example of a feedback loop according to an embodiment of the present invention.

The relationship between a target value used to control the gap between a lens and an optical disc and a total reflection return light quantity used for gap servo processing will be described with reference to FIG. 7. As illustrated in FIG. 7, a gap target value 81 is supplied to a subtracter 82. The subtracter 82 subtracts a detected total reflection return light quantity from the gap target value 81, thereby obtaining a gap error e. The gap error e is supplied to a controller 83. The controller 83 generates a lens driving signal, and supplies the lens driving signal to an actuator 84 for driving a lens (SIL). A total reflection return light quantity y obtained in a driving state of the actuator 84 after the lens driving signal has been transmitted to the actuator 84 is transmitted as a feedback signal so as to be used for the servo control processing. As illustrated in FIG. 7, the total reflection return light quantity y is a signal obtained by adding the amount of change in gap caused by a disturbance 86 to the total reflection return light quantity in an adder 85. The disturbance 86 is, for example, vibration externally transmitted to a disc apparatus or disc surface runout. In the case of disc surface runout, the disturbance 86 periodically occurs in synchronization with the rotation of an optical disc.

FIG. 8 is a diagram illustrating the relationship between a total reflection return light quantity and the gap length between a lens and an optical disc. In general, if a gap length is a distance that is equal to or longer than an approximately one-quarter of a used laser wavelength, light entering the end surface of an SIL at a total reflection angle is totally reflected from the end surface of the SIL. Accordingly, the total reflection return light quantity is constant. In contrast, if a gap length is a distance that is equal to or shorter than an approximately one-quarter of a used laser wavelength, evanescent coupling occurs between the end surface of an SIL and an optical disc and a part of total reflection return light passes through the end surface of the SIL toward the optical disc. As a result, the total reflection return light quantity decreases. When the end surface of the SIL comes into intimate contact with the optical disc, the total reflection return light quantity becomes zero. If blue-violet laser ($\lambda$=400 nm) is used, evanescent coupling occurs at a gap length equal to or shorter than approximately 70 nm depending on the refractive index of the optical disc. Accordingly, the relationship between the gap length and the total reflection return light quantity illustrated in FIG. 8 is obtained.

In an example illustrated in FIG. 8, the value of the total reflection return light quantity in the far field is normalized to 1 (V). Accordingly, a region between 0 (V) and 1 (V) is a near-field region. In the case of a gap length, the boundary between the near-field region and the far-field region is a gap length of 70 nm at which the total reflection return light quantity starts to decrease. In the near-field region, a linear relationship between the gap length and the total reflection return light quantity is obtained. On the other hand, in the far-field region, a nonlinear relationship between the gap length and the total reflection return light quantity is obtained.

As illustrated in FIG. 8, a near-field detection level is set to 0.8 (V). If the SIL is moved closer to the optical disc and the total reflection return light quantity is equal to or lower than the near-field detection level, the gap servo processing is started. As a result, a servo system can linearly and stably operate. That is, by forming a feedback loop using the total reflection return light quantity proportional to a gap length as an error signal as illustrated in FIG. 7, it is possible to control the gap length so that it becomes the gap target value illustrated in FIG. 8. Referring to FIG. 8, the gap target value is 20 nm and the total reflection return light quantity corresponding to the gap target value is 0.4 (V).

Figure 9:
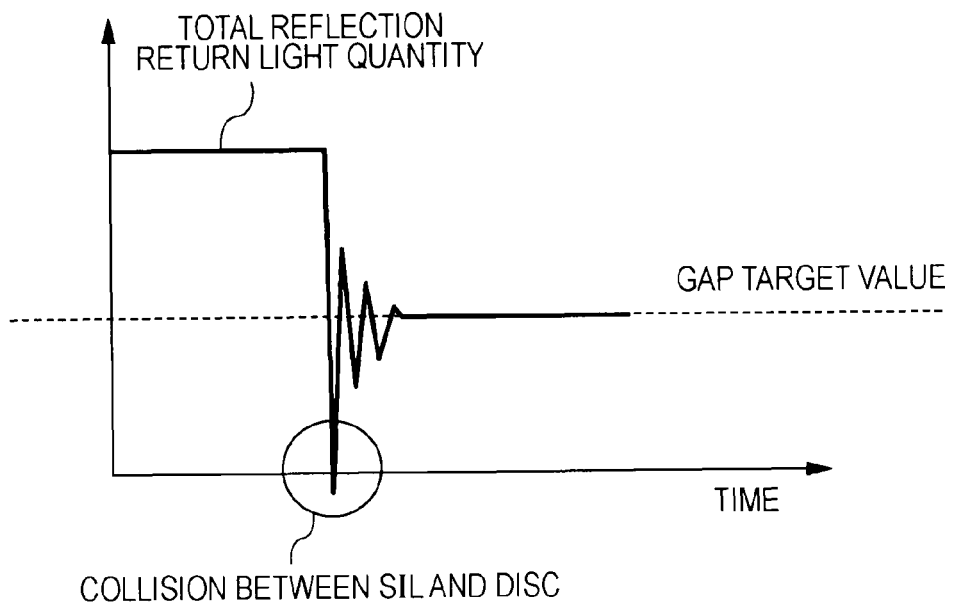
FIG. 9 is a diagram describing a total reflection return light quantity and an exemplary state in which an SIL collides with a disc.

Exemplary gap servo control processing using a total reflection return light quantity will be described with reference to FIG. 9. As described previously, in the far-field region, since a total reflection return light quantity parallel to a gap length is not obtained, the relationship between the total reflection return light quantity and the gap length is nonlinear. Accordingly, a constant value of the total reflection return light quantity is obtained irrespective of a gap length. If the gap servo processing is started at an initial lens position located in the far-field region for the purpose of reaching a final gap servo target value in the near-field region, an SIL crashes with an optical disc as illustrated in FIG. 9. Accordingly, it is important to reliably reach a final gap servo target value in the near-field region from the initial lens position located in the far-field region.

4. Process of Gap Servo Section in Operation

Figure 10:
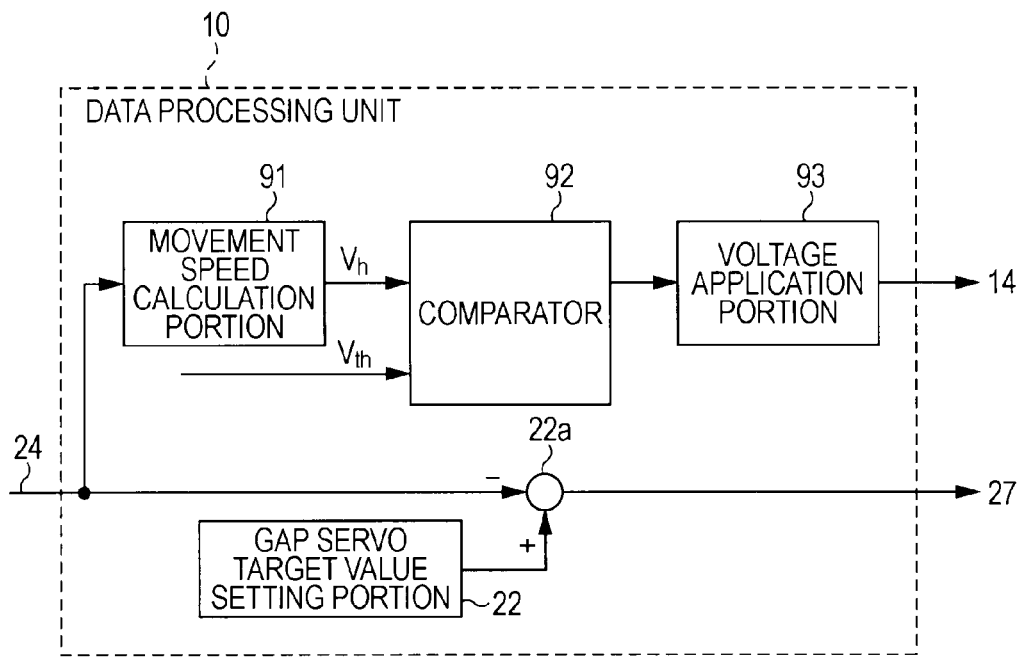
FIG. 10 is a block diagram illustrating details of a data processing unit according to an embodiment of the present invention (an exemplary configuration of the data processing unit during gap servo processing)

Next, a configuration and a process which are used to reliably reach a final gap servo target value in a near-field region will be described. FIG. 10 is a diagram illustrating a configuration of the data processing unit 10 when the gap servo section is operating. The total reflection return light quantity 24 is input into a movement speed calculation portion 91. The movement speed calculation portion 91 differentiates the total reflection return light quantity 24 corresponding to a gap error so as to calculate the movement speed of an SIL included in an optical pickup. That is, a movement speed $V_h$ of an SIL included in an optical pickup is calculated by the following equation 1 in which e(t) denotes a gap error and T denotes a time interval at which a total reflection return light quantity is sampled.

$$V_h = \frac{f(e(t)) - f(e(t-1))}{T} \quad (1)$$

In equation 1, f(*) is a relational expression between a gap length and a total reflection return light quantity which has a linear region as illustrated in FIG. 8, and is function used to calculate a gap length from a total reflection return light quantity.

The movement speed $V_h$ obtained by the movement speed calculation portion 91 is input into a comparator 92. The comparator 92 compares the movement speed $V_h$ with a permissible collision speed $V_{th}$ set in advance. The permissible collision speed $V_{th}$ is a speed at which, for example, the topcoat (protective layer) of a loaded optical disc can prevent damage to the optical disc. More specifically, the permissible collision speed $V_{th}$ is set to, for example, 0.1 m/s. Alternatively, if a speed at which the topcoat of an optical disc can prevent damage to the optical disc is 0.1 m/s, the permissible collision speed $V_{th}$ used by the comparator 92 may be set to 0.05 m/s that is half of 0.1 m/s.

The comparator 92 compares the movement speed $V_h$ with the permissible collision speed $V_{th}$. As a result of the comparison, if the movement speed $V_h$ the permissible collision speed $V_{th}$, a voltage application portion 93 does not perform voltage application. That is, the approach voltage (FF voltage) 14 is still zero. On the other hand, as a result of the comparison, if the movement speed $V_h$>the permissible collision speed $V_{th}$, it id determined that an SIL is moving at a speed higher than the permissible collision speed $V_{th}$. In this state in which the SIL included in the optical pickup is moving toward the optical disc at a speed higher than the permissible collision speed $V_{th}$, the SIP may damage the optical disc at the time of collision with the optical disc.

In this embodiment, if the comparator 92 detects that the movement speed $V_h$>the permissible collision speed $V_{th}$, the voltage application portion 93 generates a specific voltage and outputs the generated voltage as the approach voltage (FF voltage) 14. Thus, by adding a voltage to the approach voltage 14 when an approach speed higher than a standard speed is detected, it is possible to move the SIL apart from the surface of the optical disc and prevent the collision between the SIL and the optical disc. The generation of a specific voltage performed by the voltage application portion 93 will be described later with reference to FIGS. 14 and 15.

The comparator 92 performs the above-described comparison only when the SIL moves closer to the optical disc. That is, even if the condition of the movement speed $V_h$>the permissible collision speed $V_{th}$ is satisfied when the SIL moves apart from the optical disc, the SIL does not collide with the optical disc. Accordingly, when the SIL moves apart from the optical disc, it is unnecessary for the comparator 92 to perform the above-described comparison. That is, the approach voltage (FF voltage) 14 may be still zero.

The same process of generating the servo voltage 27 as that illustrated in FIG. 4 is performed in the data processing unit 10. That is, the subtracter 22a calculates a difference value between the target value set by the gap servo target value setting portion 22 and an approach voltage at the time of start of the gap servo processing (a voltage corresponding to a total reflection return light quantity at the time of start of gap servo processing). The difference value calculated by the subtracter 22a is output as the servo voltage 27 used to set a gap to the target value. The servo voltage 27 is a gap error voltage.

Figure 11:
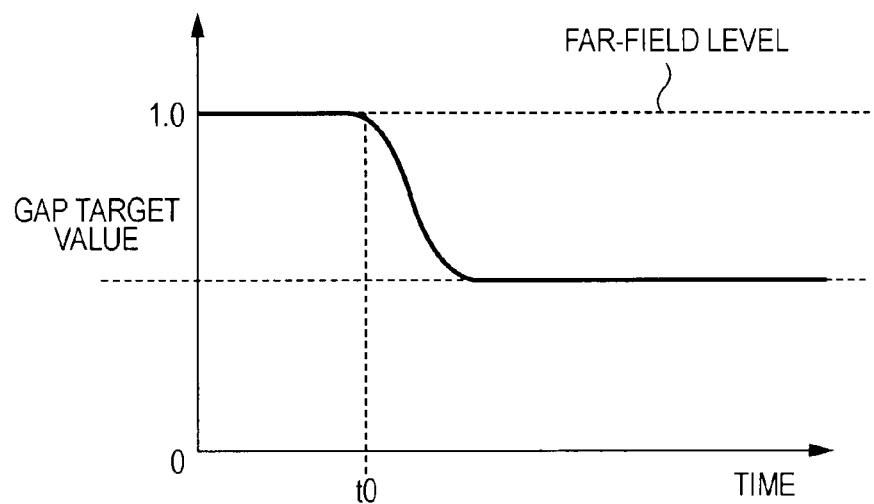
FIG. 11 is a characteristic diagram illustrating an example of gap control processing according to an embodiment of the present invention.

Next, gap servo control processing performed using the configuration illustrated in FIG. 10 will be described with reference to FIGS. 11 to 15. The slope of a pull-in voltage is the movement speed of an SIL. Accordingly, when a constant pull-in voltage is obtained, gap servo processing is started. At the time of start of the gap servo processing, as described previously with reference to FIG. 8, a total reflection return light quantity is controlled so that it reaches a final gap servo target value from a near-field detection level. Accordingly, as illustrated in FIG. 11, the target value is nonlinearly changed from a time t0 at which the far-field region is changed to the near-field region. As a result, as illustrated in FIG. 11, it is possible to reach the final gap servo target value in the near-field region from an initial position in the far-field region without the collision between the SIL and the optical disc. The above-described process is the same as that described previously with reference to FIG. 8.

Figure 12:
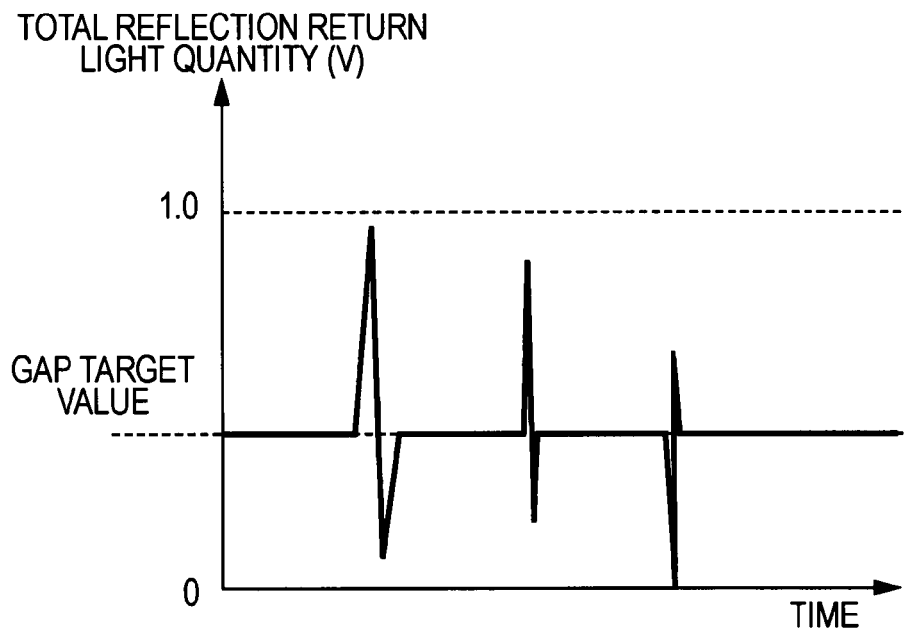
FIG. 12 is a waveform diagram illustrating an example of an undesirable change in a total reflection return light quantity.

During the gap servo processing, it is possible to reliably keep a gap in a state where there are no vibration externally transmitted to an optical disc apparatus, shock externally given to the optical disc apparatus, a defect in an optical disc, and dust on the optical disc. In reality, however, the vibration of the SIL is caused by the application of the disturbance d to the servo system as illustrated in FIG. 7, and the total reflection return light quantity changes in synchronization with the vibration of the SIL as illustrated in FIG. 12. In an example illustrated in FIG. 12, when the total reflection return light quantity becomes 0 (V), the SIL included in the optical pickup collides with the surface of the optical disc.

Figure 13:
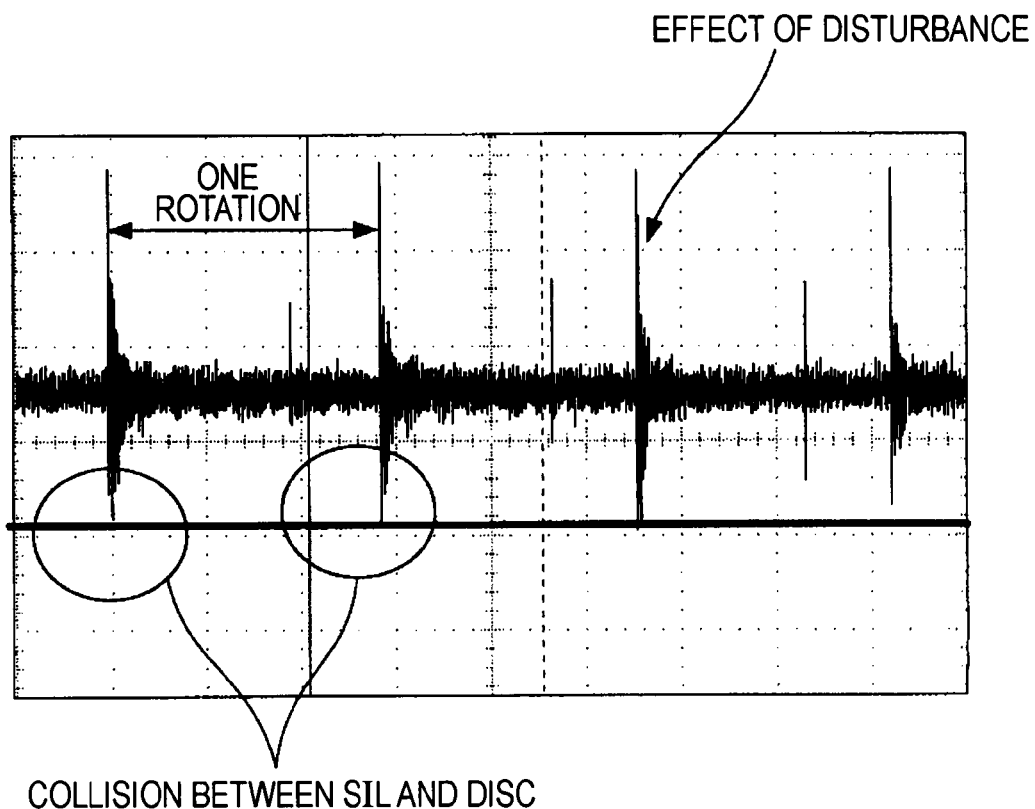
FIG. 13 is a waveform diagram illustrating an exemplary change in a total reflection return light quantity at the time of collision.

FIG. 13 is a diagram illustrating the waveform of a total reflection return light quantity when the collision between the SIL and the optical disc occurs under the influence of disturbance. Referring to FIG. 13, the SIL collides with the surface of the optical disc in synchronization with the rotation of the optical disc. It is apparent from the drawing that collision occurs every rotation under the influence of disc surface runout or the like.

In this embodiment, during the gap servo control processing, if the movement speed of the SIL included in the optical pickup exceeds a standard speed set in advance, the voltage application portion 93 illustrated in FIG. 10 performs application of a specific voltage. As a result, it is possible to prevent the SIL from colliding with the surface of the optical disc. That is, since a voltage capable of moving the SIL apart from the optical disc is used as the approach voltage (FF voltage) 14, it is possible to avoid the collision between the SIL and the optical disc.

At the time of avoiding collision, the voltage application portion 93 performs the application of a specific voltage so as to temporarily move the SIL to the far-field region (an example 1) or move the SIL apart from the optical disc in the near-field region (an example 2).

Figure 14:
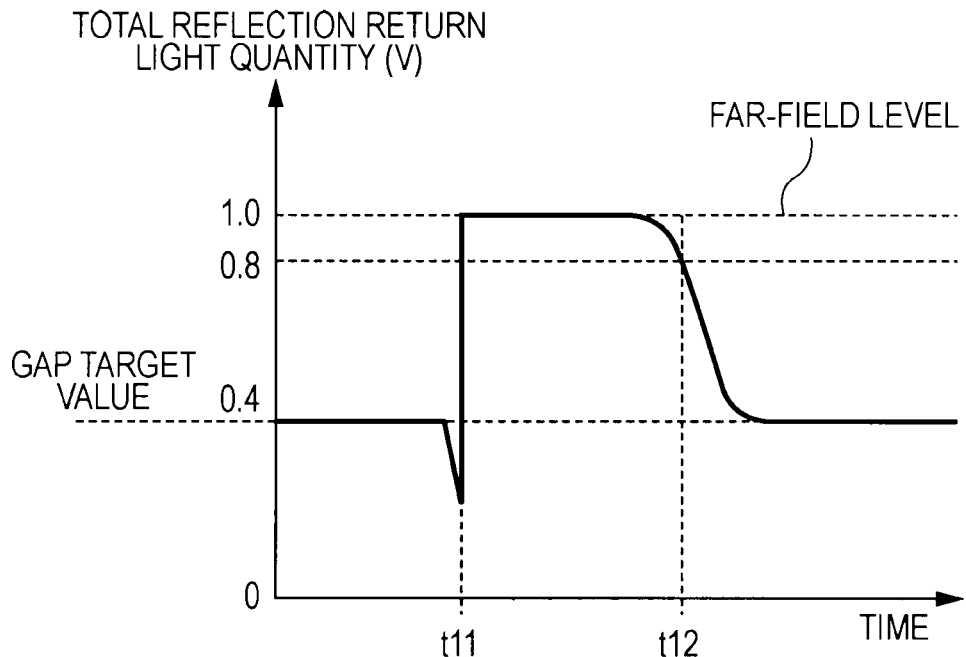
FIG. 14 is a characteristic diagram illustrating first exemplary control processing according to an embodiment of the present invention (processing for moving an SIL to a far-field region)

FIG. 14 illustrate the example 1 in which the SIL is temporarily moved to the far-field region. Referring to FIG. 14, it is assumed that the movement speed $V_h$>the permissible collision speed $V_{th}$ is detected at a time t11. At that time, the voltage application portion 93 adds a voltage to the approach voltage (FF voltage) 14 so as to obtain a voltage of 1.0 (V) corresponding to the total reflection return light quantity. As a result, the SIL is moved to the far-field region apart from the surface of the optical disc. At a time t12 after the effect of disturbance has been avoided, gap servo processing is restarted using the configuration illustrated in FIG. 3. A period of time between the time t11 and the time t12 is set in advance so that it falls within the range of, for example, 500 milliseconds to 1 second. Alternatively, after it has been determined that there is no effect of disturbance in some way, the gap servo processing may be restarted. In the example illustrated in FIG. 14, since the SIL is temporarily moved to the far-field region apart from the surface of the optical disc, it is possible to avoid the collision between the SIL and the optical disc with certainty.

Figure 15:
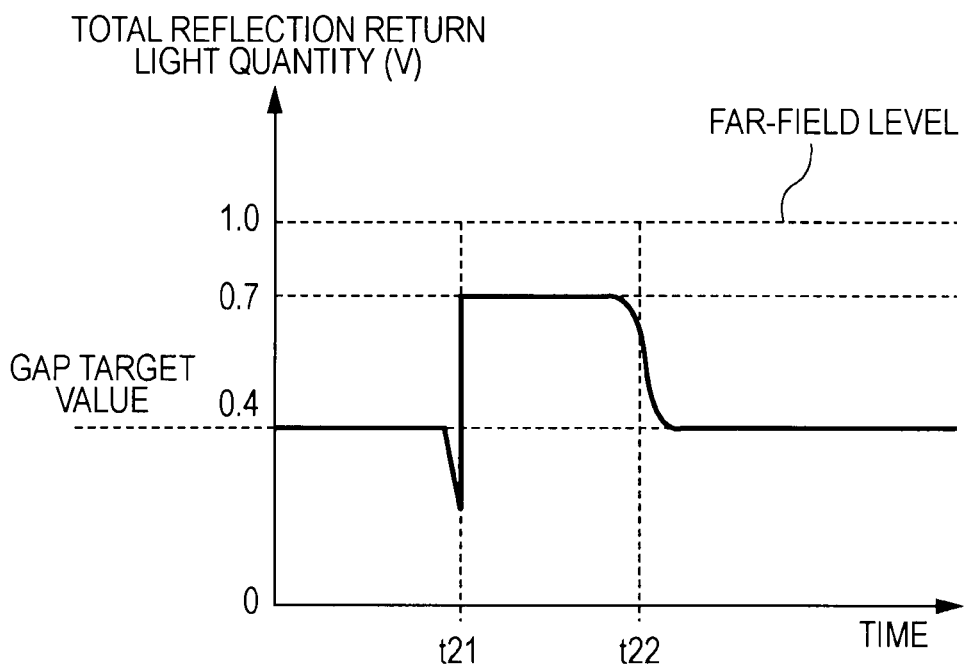
FIG. 15 is a characteristic diagram illustrating second exemplary control processing according to an embodiment of the present invention (processing for moving an SIL in a near-field region).

FIG. 15 illustrates the example 2 in which the SIL is moved apart from the optical disc in the near-field region. Referring to FIG. 15, it is assumed that the movement speed $V_h$>the permissible collision speed $V_{th}$ is detected at a time t21. At that time, the voltage application portion 93 adds a voltage to the approach voltage (FF voltage) 14 so that the SIL is moved to a position in the near-field region (a level corresponding to the total reflection return light quantity of 0.7 (V) in the example illustrated in FIG. 15) which is farther from the optical disc than a position corresponding to a gap target value. At a time t22 after the effect of disturbance has been avoided, gap servo processing is restarted using the configuration illustrated in FIG. 3 for the purpose of reaching the gap target value of 0.4 (V). A period of time between the time t21 and the time t22 is set in advance so that it falls within the range of, for example, 500 milliseconds to 1 second. Alternatively, after it has been determined that there is no effect of disturbance in some way, the gap servo processing may be restarted. In the example illustrated in FIG. 15, since the SIL stays in the near-field region after the retreat processing has been performed, it is possible to rapidly return the SIL to a target position at the time of start of the gap servo processing. This can reduce the period of time during which recording or reproduction is suspended.

As described previously, according to this embodiment, in an optical disc apparatus using near-field light, the movement speed of an SIL is estimated by differentiating a total reflection return light quantity corresponding to a gap error and the estimated SIL movement speed is compared with a permissible SIL collision speed. As a result of the comparison, if the SIL movement speed is higher than the permissible SIL collision speed, a process of moving the SIL apart from an optical disc is performed. Consequently, it is possible to avoid damage to the optical disc which is caused by the collision between the SIL and the optical disc.

Thus, only by differentiating the total reflection return light quantity, it is possible to estimate the SIL movement speed. Accordingly, it is possible to avoid collision with a relatively simple configuration. That is, it is unnecessary to change the basic configuration of a servo system dislike in an exemplary case in which the servo band of a focus control system is increased to a specific frequency band so as to improve robustness against disturbance or an exemplary case in which improved robustness against disturbance is achieved using the shape of a lens.

5. Description of Modification

In the above-described embodiment, the configuration of an optical disc apparatus illustrated in FIG. 1 and the configurations of a gap servo section illustrated in FIGS. 3, 4, and 10 are illustrative examples only, and various modifications and changes can be made within the scope of the present invention. Furthermore, in the above-described embodiment, the detected value (estimated value) of the movement speed of an SIL which is obtained by differentiating the value of a total reflection return light quantity is compared with a permissible collision speed so as to control an SIL driving unit included in an optical pickup. The control of the driving state of the SIL may be performed with another configuration and another process using information about the obtained movement speed of the SIL. Still furthermore, in the above-described embodiment, an actuator for driving an SIL is controlled. An optical pickup including an SIL may be driven and retreated. A voltage value corresponding to a total reflection return light quantity and a control value used for control of the distance between the surface of an optical disc and a lens which have been described in the above-described embodiment are illustrative examples only. In particular, a desirable gap value that is the distance between the surface of an optical disc and a lens is changed in accordance with the wavelength of laser light used for recording and reproduction, and is not limited to the above-described value.

Still furthermore, in the above-described embodiment, if a detected lens speed exceeds a speed at which the topcoat of an optical disc can prevent the optical disc from being damaged by a collision with a lens, retreat processing is performed. Similar retreat processing may be performed upon an apparatus for driving an uncoated optical disc.

Still furthermore, pieces of hardware such as a processing unit for differentiating the value of a total reflection return light quantity and a comparator for performing comparison using a value obtained by the differentiation are used for gap servo control processing according to an embodiment of the present invention. However, the gap servo control processing may be performed by causing software to perform computation processing.

The present application contains subject matter related to that disclosed in Japanese Priority Patent Application JP 2008-311642 filed in the Japan Patent Office on Dec. 5, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc apparatus comprising:
   a driving unit configured to rotationally drive an optical disc;
   an optical pickup configured to record/reproduce a signal on/from the optical disc by emitting laser light and near-field light onto a signal recording surface of the optical disc;
   an optical pickup driving unit configured to set a distance between the optical pickup and the optical disc;
   a movement speed calculation unit configured to calculate a movement speed of a lens included in the optical pickup by differentiating a total reflection return light quantity of the laser light emitted onto the optical disc which is detected by the optical pickup, the total reflection return light quantity corresponding to light parallel to linear polarized reflected laser light from the optical disc; and
   a control unit configured to modify driving processing that is performed upon the optical pickup, or the lens included in the optical pickup, by the optical pickup driving unit on the basis of the movement speed calculated by the movement speed calculation unit,
   wherein the control unit is configured to compare the movement speed calculated by the movement speed calculation unit with a permissible speed set in advance, and to perform retreat processing moving the optical pickup, or the lens included in the optical pickup, apart from a surface of the optical disc to a new position when detecting that the movement speed exceeds the permissible speed, and
   wherein the optical pickup is further configured to record/reproduce the signal on/from the optical disc at the new position in response to the control unit performing the retreat processing.

2. The optical disc apparatus according to claim 1, wherein the optical pickup driving unit is configured to drive a solid immersion lens included in the optical pickup, and
   the control unit is configured to perform retreat processing for moving the solid immersion lens apart from the surface of the optical disc on the basis of the movement speed calculated by the movement speed calculation unit.

3. The optical disc apparatus according to claim 2, wherein the retreat processing performed by the control unit moves the solid immersion lens to a far-field region in which the near-field light is not generated.

4. The optical disc apparatus according to claim 2, wherein the retreat processing performed by the control unit moves the solid immersion lens apart from the surface of the optical disc in a near-field region in which the near-field light is generated.

5. The optical disc apparatus according to claim 1, wherein the permissible speed is the maximum speed at which a coating layer on the surface of the optical disc can protect the surface of the optical disc from damage caused by contact with the lens.

6. The optical disc apparatus according to claim 1, wherein the control unit is configured to perform retreat processing for temporarily moving the optical pickup or the lens included in the optical pickup apart from the surface of the optical disc when detecting that the movement speed exceeds the permissible speed, and
   the optical pickup or the lens included in the optical pickup is temporarily moved apart from the optical disc until a predetermined condition is determined to have been met.

7. The optical disc apparatus according to claim 1, wherein the control unit is configured to perform the retreat processing such that the optical pickup or the lens included in the optical pickup is moved apart to a predetermined position.

8. An optical disc drive control method comprising:
   calculating a movement speed of a lens included in an optical pickup by differentiating a total reflection return light quantity that is detected by emitting laser light and near-field light onto a signal recording surface of a rotationally driven optical disc, the total reflection return light quantity corresponding to light parallel to linear polarized reflected laser light from the optical disc;

performing, in a case where the calculated movement speed exceeds a permissible speed set in advance, retreat processing for moving the optical pickup or the lens included in the optical pickup, apart from a surface of the optical disc to a new position; and recording/reproducing a signal on/from the optical disc at the new position in response to the performance of the retreat processing.

* * * * *